United States Patent
Ledentsov

(10) Patent No.: US 9,936,193 B2
(45) Date of Patent: *Apr. 3, 2018

(54) DEVICE FOR GENERATION OF COLORED VIRTUAL THREE-DIMENSIONAL IMAGES

(71) Applicant: Nikolay Ledentsov, Berlin (DE)

(72) Inventor: Nikolay Ledentsov, Berlin (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/999,451

(22) Filed: May 9, 2016

(65) Prior Publication Data

US 2016/0261858 A1    Sep. 8, 2016

Related U.S. Application Data

(62) Division of application No. 12/931,147, filed on Jan. 26, 2011, now abandoned.

(51) Int. Cl.
| | | |
|---|---|---|
| G02B 27/22 | (2006.01) | |
| H04N 13/04 | (2006.01) | |
| G03B 21/28 | (2006.01) | |
| G03B 35/22 | (2006.01) | |
| G06T 19/00 | (2011.01) | |
| H04N 13/00 | (2018.01) | |
| G03B 21/53 | (2006.01) | |
| G03B 17/54 | (2006.01) | |

(52) U.S. Cl.
CPC ..... *H04N 13/0459* (2013.01); *G02B 27/2221* (2013.01); *G03B 21/28* (2013.01); *G03B 35/22* (2013.01); *G06T 19/006* (2013.01); *H04N 13/0022* (2013.01); *H04N 13/042* (2013.01); *H04N 13/0422* (2013.01); *H04N 13/0456* (2013.01); *H04N 13/0495* (2013.01); *H04N 13/0497* (2013.01); *G03B 17/54* (2013.01); *G03B 21/53* (2013.01); *H04N 2013/0081* (2013.01)

(58) Field of Classification Search
CPC ............ G02B 27/2221; G02B 27/2228; G02B 27/2235; G02B 27/2242; H04N 13/0495
USPC .... 359/462, 362, 464, 467, 479; 348/51, 60; 345/6, 156
See application file for complete search history.

(56) References Cited

U.S. PATENT DOCUMENTS

| | | | | |
|---|---|---|---|---|
| 7,806,533 B2* | 10/2010 | Boute | ................ | G02B 27/2292 348/14.01 |
| 2005/0162381 A1* | 7/2005 | Bell | ...................... | G06F 3/0428 345/156 |
| 2011/0188116 A1* | 8/2011 | Ledentsov | ......... | H04N 13/0495 359/479 |
| 2016/0127722 A1* | 5/2016 | Ledentsov | ......... | H04N 13/0495 348/51 |

FOREIGN PATENT DOCUMENTS

JP        2002169124 A    *  6/2002

* cited by examiner

*Primary Examiner* — Audrey Y Chang

(57) ABSTRACT

A device for generation of three-dimensional images in the observer's eye using at least one two-dimensional display and an optical system with an adjustable focal length. The display generates planar images corresponding to the different depths of the designed three dimensional (3D) image and the images are then directed to at least one mirror or lens with the adjustable focal length synchronized to the particular image. The optical system generates virtual images at different virtual planes in such a way that the eye receives a complete 3D virtual image.

4 Claims, 7 Drawing Sheets

N. Ledentsov "DEVICE FOR GENERATION OF COLORED VIRTUAL THREE-DIMENSIONAL IMAGES"

N. Ledentsov "DEVICE FOR GENERATION OF COLORED VIRTUAL THREE-DIMENSIONAL IMAGES"

N. Ledentsov "DEVICE FOR GENERATION OF COLORED VIRTUAL THREE-DIMENSIONAL IMAGES"

(700)

image processing unit (730)

projector  3D camera (720)

virtual object (705)  (710)

eye (740)

real object

Fig. 7

DEVICE FOR GENERATION OF COLORED VIRTUAL THREE-DIMENSIONAL IMAGES

RELATION TO OTHER PATENT APPLICATIONS

This application claims the benefit of U.S. Provisional Application No. 61/337,263, filed on Feb. 2, 2010. This application is a divisional application of the U.S. patent application Ser. No. 12/931,147, filed on Jan. 26, 2011.

BACKGROUND OF THE INVENTION

Field of the Invention

The present invention relates to a device generating virtual three dimensional (3D) images, preferably moving images, formed from planar two-dimensional (2D) images. More specifically the present invention relates to a device for generation of virtual 3D moving images such as 3D video or motion pictures.

Description of Related Art

There is a need in generation of three-dimensional moving images. Possible applications include 3D: cinema; TV displays, out-of-door advertisement boards; computer monitors for training and education; mobile phone projectors, head-up-displays, interactive displays, "touch screen" displays and other. There are different approaches for generation of 3D images.

Some of the approaches are based on the delivery of two different images generated on a surface of a special screen separately to the observer's left and right eyes thus generating a stereoscopic image. This goal may be achieved by glasses, for example, using blinking glasses synchronized with the display sequentially demonstrating the "left" and the "right" images on the screen. In this case the left and the right eye get the corresponding images separately. In another approach the glasses separate the images for the left and the right eye by using polarized glasses (different linear or circular polarization for the left and the right eyes) and the two polarized images created on the polarization-maintaining screen. It is also possible to generate images on the conventional screen using two slightly different wavelengths in the red, green and blue spectral ranges and then apply glasses with the corresponding spectrally-sensitive filters to let each eye receive its own full color image based on the related selected wavelengths.

In another approach a 3D stereoscopic image is realized by using lens gratings attached to the screen, and an image composed of the alternating stripes of the "left eye" and "right eye" images with the same special periodicity as the periodicity of the lens grating. The lens grating properly attached to the screen deflects the images in a narrow angle space to match the left and the right eye separately. However, the viewing angle range is very narrow in this approach making it so far less suitable for major applications.

In another approach the real 3D object is created by the rotation or motion of a screen or a frame and the synchronized generation of images corresponding to different 3D image planes occurs. In this approach the signal generation is synchronized with the rotation speed. In this way a 3D image is generated in the eye without any need in special glasses providing an immense advantage over the glass-related approaches. Special data processing algorithms are developed to generate a 3D image in real time, for example by processing the data derived from stereoscopic or holographic 3D images. For example, left eye and right eye images from conventional glass-assisted 3D images can be processed, coded to a new approach and used to generate 3D images in the moving screen approach.

While suited for their intended purpose, a disadvantage of devices of this type is that the display must move at a high rotation or one-directional motion speed. Furthermore the most common rotary 3D displays require complex and highly precise mechanics and the related precisely synchronized display imaging schemes.

On the other hand an approach for generating of virtual 3D images from real 3D objects is known and used in entertainment and for educational purposes for many centuries already and can serve as a prior art prototype for the present invention.

SUMMARY OF THE INVENTION

An object of the present invention aims elimination of the above-mentioned disadvantages by providing a virtual image device generating 3D images in the eyes of the observer using conventional displays, based, for example, on conventional DLP or LCOS microdisplay technologies, or the screens with projected images of the related microdisplays. Furthermore, liquid crystal (LCD), plasma (PD) or organic LED (OLED) displays can be used for 3D image generation.

The disadvantages of the previous 3D motion display approaches can be eliminated by the features of the virtual image device of the present invention which comprise at least one lens or mirror, or their combination, capable to generate virtual images at different virtual planes. When the images are generated at different virtual image planes correspond to the different depths of the designed virtual 3D image, and the time duration for the image generation is shorter than the eye time resolution, a complete 3D virtual image can be formed in the observer's eye. For example, the images at different image depth can be generated at the 2D display, while the lens system will generate virtual images at different virtual image planes directly in the eye of the observer. No need in the display motion is required (even can be also applied) and any conventional display approach can be used. A very high quality of the moving 3D image can be realized. Plasma, OLED, DLP, LCD or CRT displays may generate initial images. A synchronized motion of the lens and/or mirror can be needed and a motion of the 2D displays can be additionally applied. As the lenses with an adjustable focus may have a rather small weight and volume, the motion is simplified. In certain cases the lenses or mirrors may not move, while electro-optic or acousto-optic or piezo-optic effects may be applied to change the focal lengths. Furthermore, microdisplay-based adjustable lenses may be applied. For example, standard DLP micro-electro-mechanic system (MEMS) technology may be used to cause tunable focal length of the lense or a tunable shape of the reflecting mirror. Liquid or other deformable lenses and mirrors can be also applied. In the case when the focal length is sensitive to the wavelength, for example, when diffraction gratings are introduced or wavelength-dispersive medium is used for the lenses or mirrors no adjustments of lenses or mirrors are needed and the 3D image may be generated by wavelength tuning of the light used for the generation of the images.

BRIEF DESCRIPTION OF THE DRAWINGS

The key objects, advantages, and features of the invention will become apparent from the foregoing detailed description taken in connection with the accompanying drawings, in which.

(b) is a schematic view of a virtual image device according to the prior art invention; a mirror is used to generate the virtual image.

(c) is a schematic view of a virtual image device according to the prior art invention; a mirror is used to generate the virtual image. The virtual image is enlarged as compared to the real object.

Figure 5:
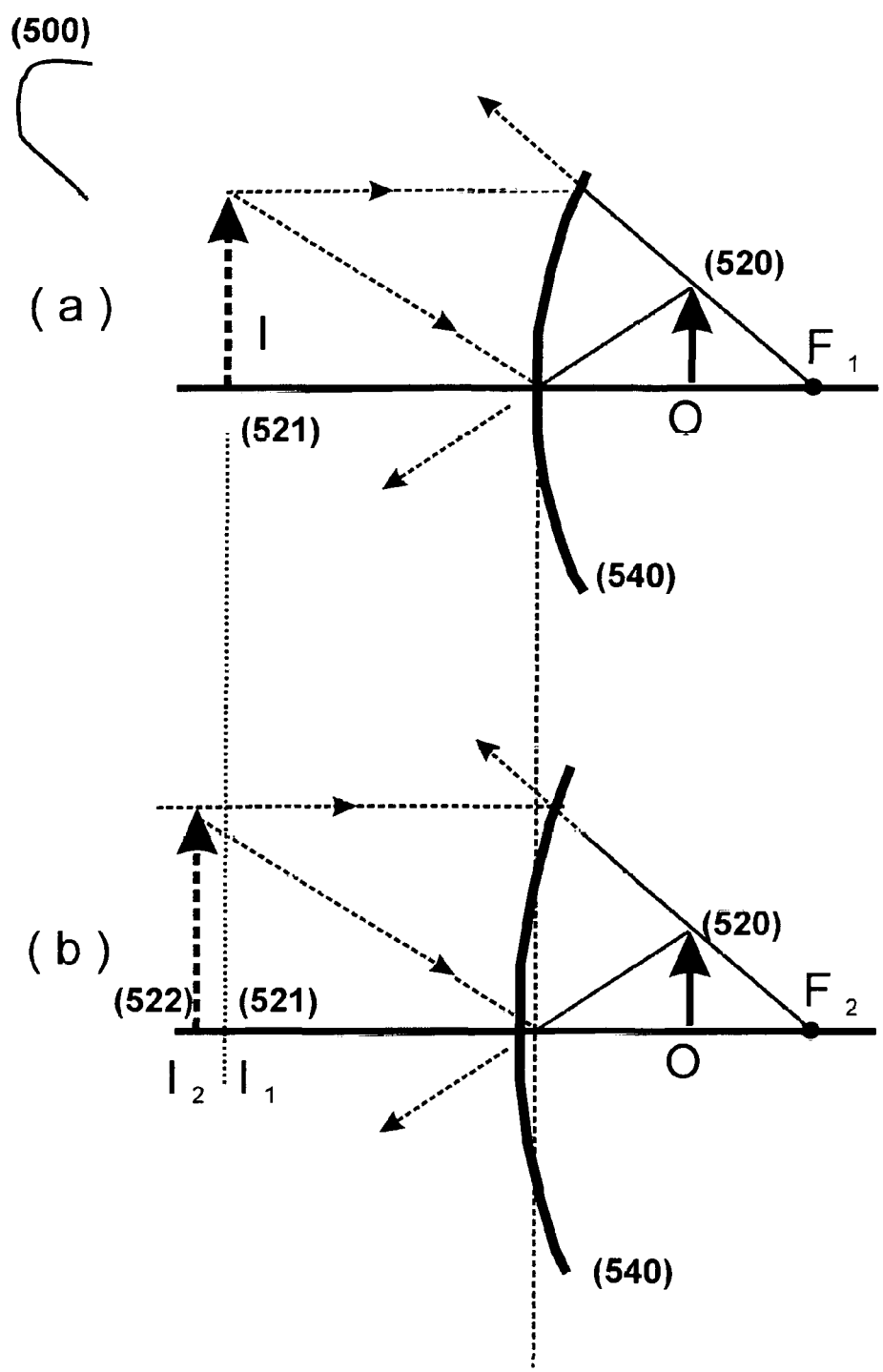

FIG. 5 is a schematic view of a virtual image device according to the present invention; a focus-adjustable mirror is used to generate the virtual image at different depths of the resulting three-dimensional (3D) virtual image. The virtual two-dimensional (2D) images are positioned at different virtual planes when the focus of the adjustable lens is affected (a,b).

Figure 6:
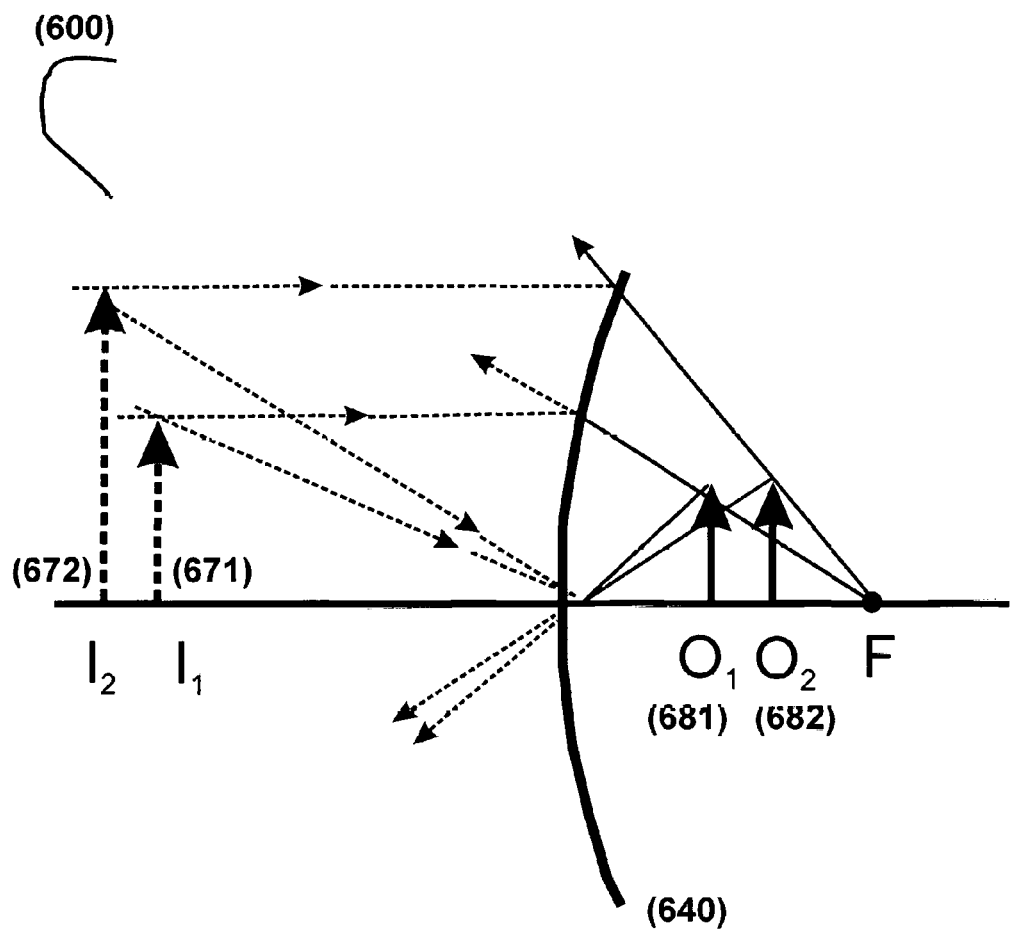

FIG. 6 is a schematic view of a virtual image device according to the present invention; a focus-adjustable mirror (640) is used to generate the virtual image at different depths (671), (672) of the resulting three-dimensional (3D) virtual image. The virtual two-dimensional (2D) images (681), (682) are positioned at different virtual planes when the focus of the lens or mirror (640) is affected due to the different wavelengths of the light used to generate the images (671), (672).

FIG. 7 is a schematic representation of the interactive system composed of: a projection display generating virtual image in the observer's eye; a real object; a camera suitable for taking three-dimensional pictures and an image-processing system, which aligns the geometrical characteristics of a real object with the geometrical characteristics of the virtual image allowing to obtain necessary interactivity by aligning real and virtual images according to the selected algorithm.

DETAILED DESCRIPTION OF THE INVENTION

Figure 1:
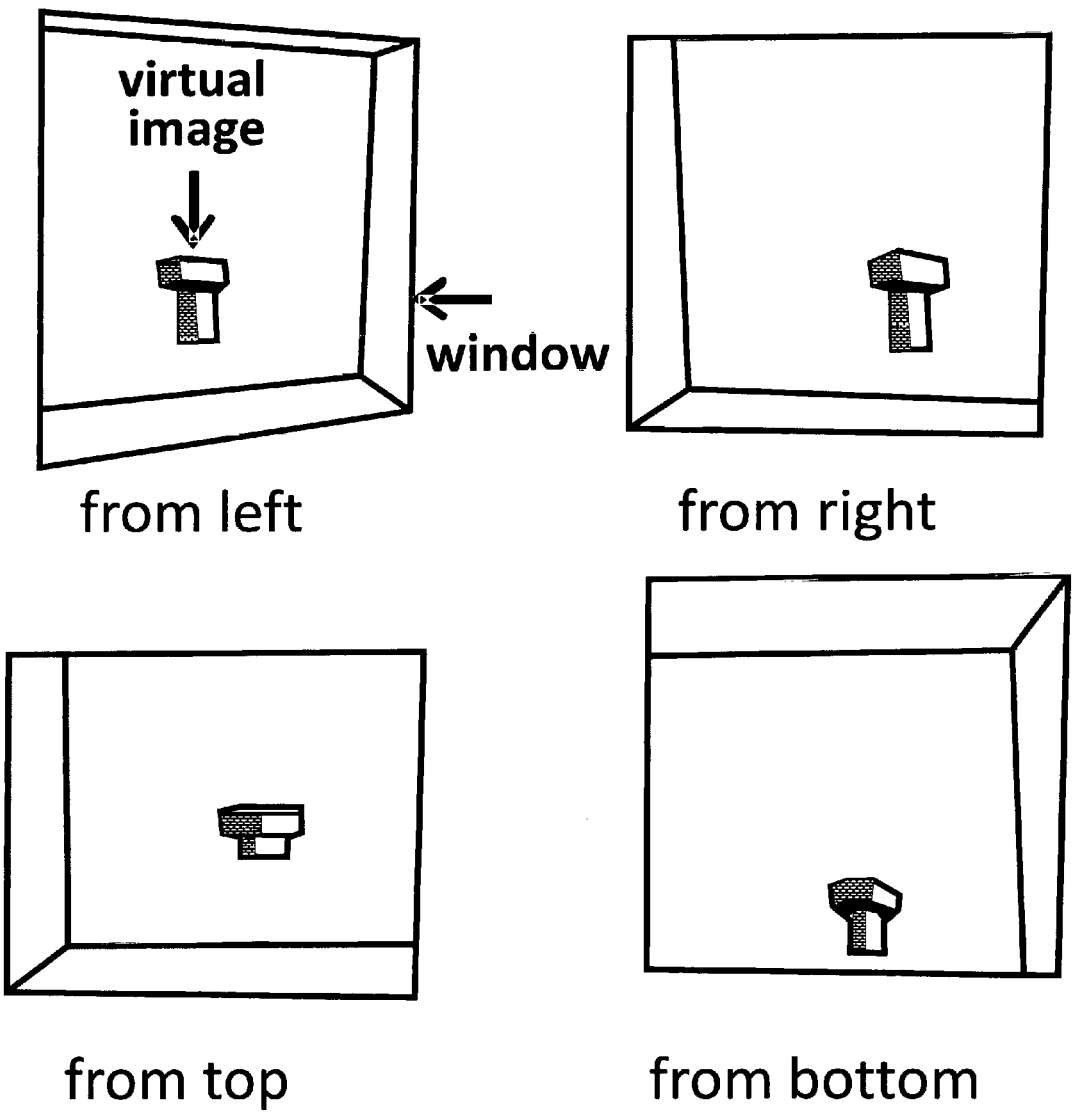
FIG. 1. A virtual image of the object originating in the eyes in prior art device.

The virtual 3D image production device is shown in FIGS. 1-7 for purposes of illustration. In FIG. 1 we show an eye appearance of a three-dimensional object in a prior art device generating virtual images. A high-quality virtual image hardly distinguishable from the original real object may be generated.

Figure 2:
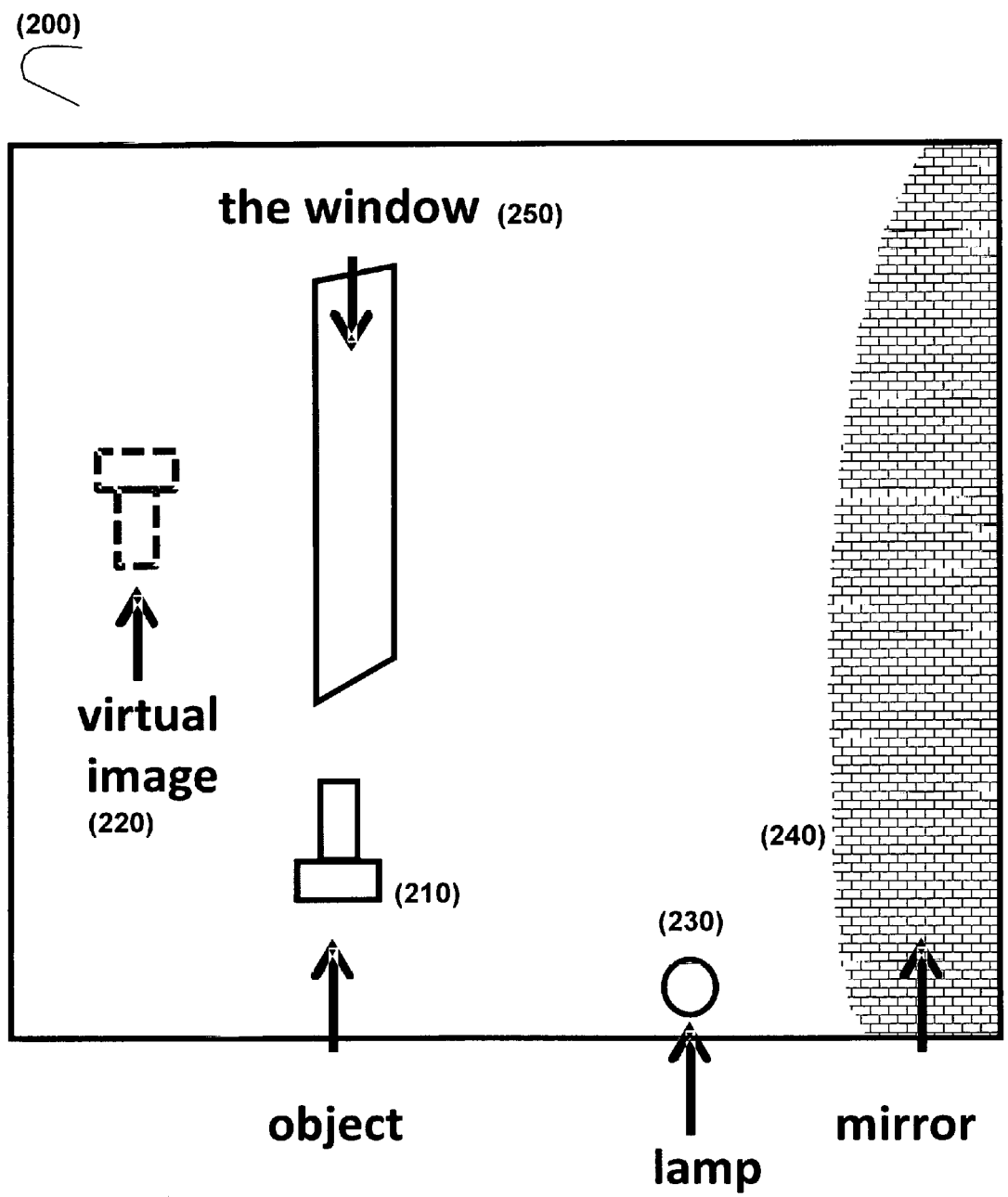
FIG. 2. Prior art device. An internal arrangement of the elements in a typical prior-art device is shown. A real object illuminated by a lamp and the light coming from the object is reflected by a curved mirror through a window to form a virtual image in the observer's eyes. The observer is looking at the window form outside, as depicted in FIG. 1.

FIG. 2 shows a schematic cross-section of the prior art device (200). A virtual image (220) of the object (210) is originating in the observer's eye as illustrated in FIG. 1 due to an optical system (250) composed of: a real object (210); a lamp (230); and a curved mirror (240). The light from the real object illuminated by a lamp is reflected by a curved mirror (240) through a window (270) and a virtual image is formed for the observer's eyes. The observer is looking at the window (270) form outside, as depicted in FIG. 1.

Figure 3:
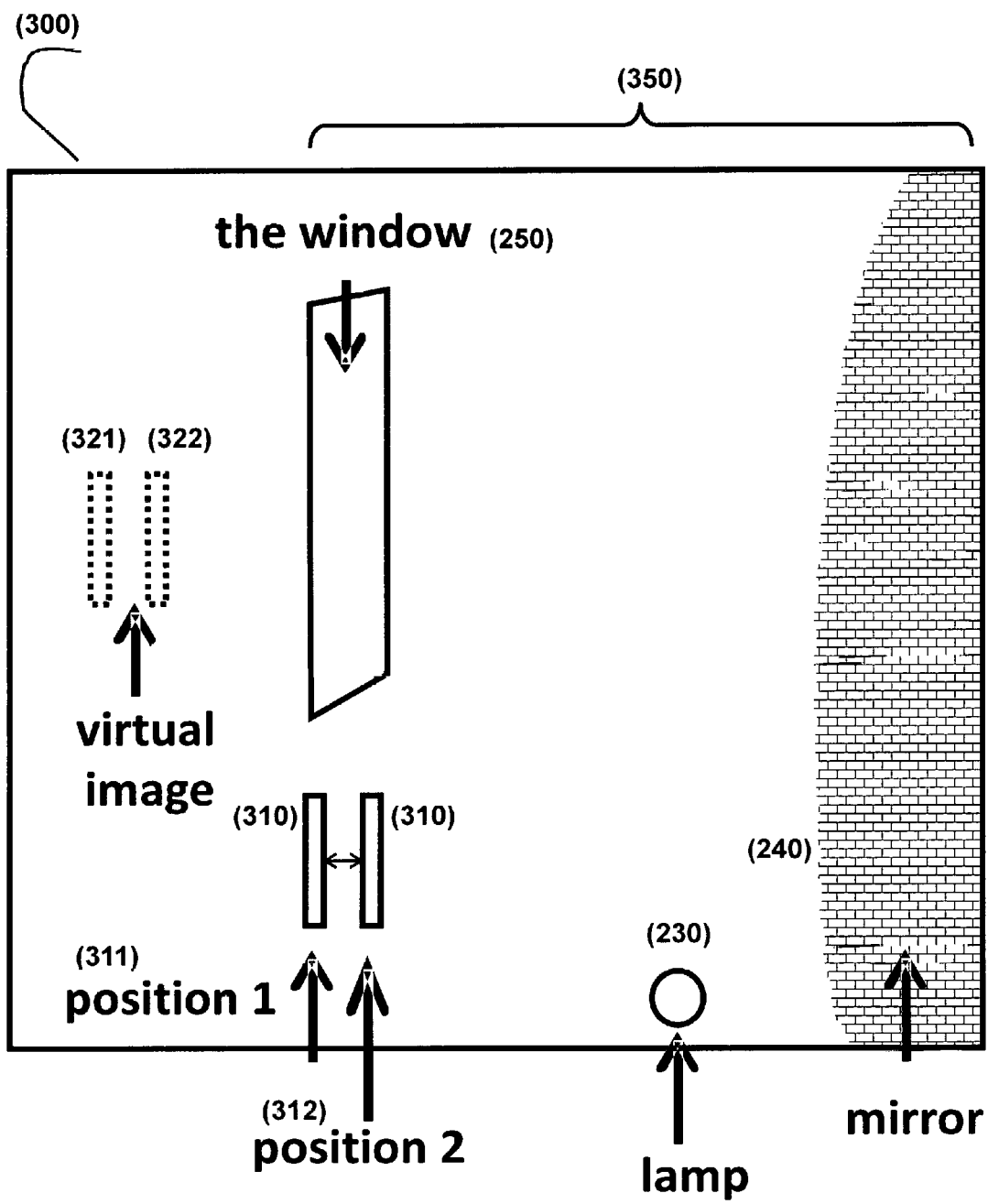
FIG. 3. A device similar to shown in FIG. 2 where the real object is replaced by a display. The display moves in between of the two or more positions. The image on the display is changed when the display is moved. In this case a virtual three-dimensional image can be generated in the eye from a set of two-dimensional images if the motion is faster than the eye time-resolution.

A device (300) similar to shown in FIG. 2 where the real object (210) is replaced by a two-dimensional display (310) is shown in FIG. 3 to form an optical system (350). The display (310) moves in between of two or more positions ((311, (312)). The image on the display is changed when the display is moved. In this case a virtual three-dimensional image can be generated in the eye from a set of two-dimensional images ((321), (322)) if the motion is faster than the eye averaging time and the image sequence is synchronized with the motion speed in an appropriate way.

Figure 4:
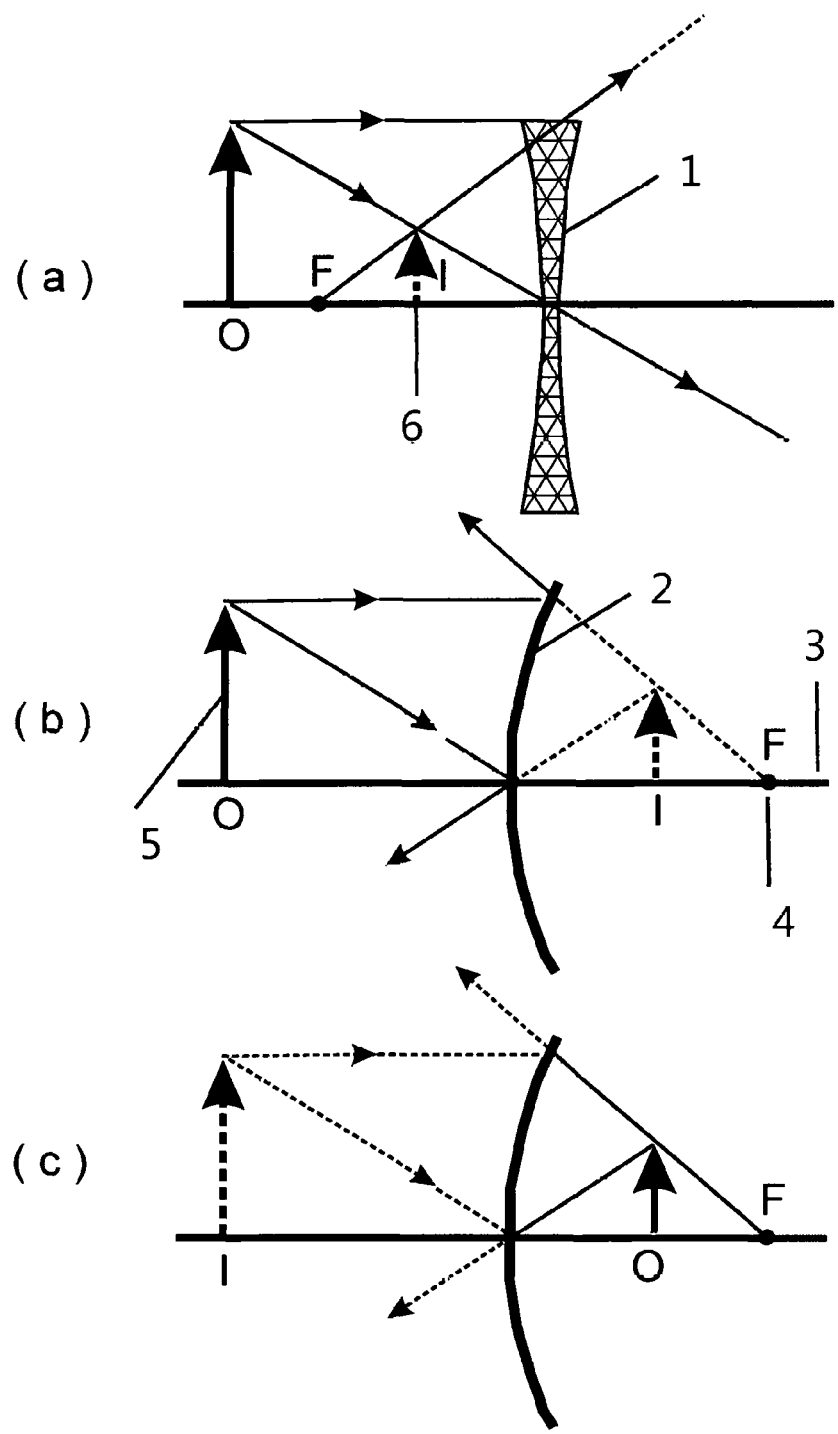
FIG. 4(a) is a schematic view of a virtual image device according to the prior art invention; a lens is used to generate the virtual image.

In FIG. 4 we show schematically a sketch of the optical system of prior art device which generally includes at least one lens (1) or a mirror (2) positioned with respect to the optical axis (3) and having a finite or infinite focus (F) length (4). An object (O) is positioned (5) with respect to the optical axis and lens(es) or mirror(s). The optical system results in a virtual image I (6). Optical system may be arranged in such a way that the virtual image may be reduced (FIGS. 4a,b) or enlarged (FIG. 4c) with respect to the object nr a real image.

The properties of the lens or the mirror used can be either movable, or deformable or modified by acousto-optic, electrooptic, piezo-optical, thermal or other suitable effects. Many types of tunable-focus lenses and mirrors are known and their present and future modifications can be used.

In FIG. 5 one illustrates the optical system (500) when the mirror (540) is deformable and this affects the actual focus length. Then the virtual image plane (521), (522) will move in space. Consequently, when the images corresponding to the different 3D image depths are generated by the display (550) these can be properly positioned by the synchronized movable mirror system. In addition to the adjustment of the lenses or mirrors the screen motion can be also applied. The motion of the lenses and mirrors and the display may occur in all three dimensions when necessary.

FIG. 6 illustrates the optical system (600) of another embodiment of the present invention. The lens or mirror (640) chosen in this case is neither movable nor deformable. However, the focal length of the lens or mirror (640) is wavelength-sensitive, for example, due to the related refractive index dependence of the material used in the lens or mirror (640) or due to diffraction granting introduced or any other approach or their combination. Then the images can be separated in depth by projecting different depth images in slightly different colors for the same basic color range. Then separate virtual 3D images in blue (671), red (672) and green spectral ranges may be generated. These images may be also fused into the final full-color virtual 3D image using any of the image fusion techniques, for example, using additional diffraction gratings as angle-sensitive mirrors.

Furthermore two separated 2D images for the left and the right eye, originating from two different displays, may be fused into a one virtual image using a similar approach adding a possibility of stereoscopic imaging without using lens arrays attached to the display. This approach may provide additional flexibility and complexity to the device.

In all of the embodiments, the formation of a virtual 3D image from different 2D image planes should preferably occur within the finite time response resolution of the human eye.

In FIG. 7 we show a schematic representation of an interactive system (700) composed of a projection display generating virtual image (705) in the observer's eye, a real object (710), a camera (720) suitable for taking three-dimensional pictures and an image-processing system (730), which aligns the geometrical characteristics of the real object with the geometrical characteristics of the virtual image (705) and allows to obtain the necessary interactivity by image recognition data processing techniques according to the selected algorithm.

For example, a virtual keyboard can be projected at a certain virtual distance with respect to the operator's eyes (740), for example in front of the face of the operator or on top of the desk in front of the operator. The hands of the operator are monitored by a three-dimensional camera. In one embodiment only the virtual image of the keyboard is projected. In another embodiment also a three-dimensional virtual image of the operator's hands is projected. The latter version is useful when the operator observes simultaneously a real or another virtual image. For example, a driver or a pilot may need this approach to change the parameters of the motion or communicate certain information without deflection from a window or a screen or another virtual image generated in his eyes. The projector and the camera are connected to the image processing system which aligns virtual keyboard and a real or a virtual hand of the operator and the necessary functionality is achieved. For example, typing of symbols or letters, or drawing figures onto a virtual screen can be realized.

The system may be useful for automotive, airspace, gaming and other industries and can be broadly used in mobile phones and other gadgets.

While the present invention has been described in connection with the preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A projection device (600) for generation of three-dimensional images,
    wherein said device generates three-dimensional images in at least two colors,
    wherein said at least two colors comprise a first basic color and a second basic color distinct from said first basic color,
    wherein said first basic color and said second basic color are selected from the group consisting of three basic colors,
    wherein said three basic colors are red, green and blue,
    wherein said projection device comprises
        a) a first display (681) generating two-dimensional images in said first basic color,
        b) a second display (682) generating two-dimensional images in said second basic color,
        c) at least one mirror (640), the focal length of which is wavelength-sensitive, and thus can be a tunable focal length being tuned by variation of the wavelength of light,
    wherein said first display (681) and said at least one mirror (640) generates a first virtual image at a first plane,
        such that at least two wavelengths in said first basic color range are used,
        such that said first virtual image is generated at different depths,
        such that the sequence of said first virtual images is synchronized with the variation of said wavelength-sensitive focal length of said at least one mirror (640),
        such that a complete first three-dimensional virtual image (671) in a first basic color is formed in front of a face of an observer,
        such that the eyes of the observer receive said complete three-dimensional image in said first basic color,
    wherein said second display (682) and said at least one mirror (640) generates a second virtual image at a second plane,
        such that at least two wavelengths in said second basic color range are used,
        such that said second virtual image is generated at different depths,
        such that the sequence of said second virtual images is synchronized with the variation of said wavelength-sensitive focal length of said at least one mirror (640),
        such that a complete second three-dimensional virtual image (672) in a second basic color is formed in front of a face of an observer,
        such that the eyes of the observer receive said complete three-dimensional image in said second basic color,
    wherein said first three-dimensional virtual image in said first basic color and said second three-dimensional virtual image in said second basic color generate an image perceived by an observer as a colored three-dimensional image.

2. The projection device of claim 1 wherein said device is selected from the group consisting of:
    a) a film projector,
    b) a slide projector,
    c) a TV projector,
    d) an outdoor advertisement projector,
    e) a head up display, and
    f) a mobile display.

3. The projection device of claim 1, wherein two-dimensional images are generated by a device selected from the group consisting of:
    a) a plasma display,
    b) a liquid crystal display,
    c) a light-emitting diode (LED) display,
    d) an organic LED display,
    e) a cathode ray tube (CRT), and
    f) a laser projection display.

4. An interactive system (700) comprising
    a) a projection device of claim 1 configured such that it generates the complete three-dimensional virtual image in front of the face of the observer,
    b) a real object (710),
    c) a camera (720) capable of taking three-dimensional pictures, and
    d) an image-processing system (730), which aligns the real object (710) with the virtual image (705),
    wherein said first real object (710) is selected from the group consisting of
        i) a hand of the operator,
        ii) a keyboard; and
        iii) a combination of i) and ii),
    wherein formation of a first image, wherein said first image is a virtual image of said real object, allows the observer to observe said first image without deflection of the observer's attention from simultaneous observation of a second image,
wherein said second image is selected from the group consisting of:
A) a real image of said second real object, and
B) a virtual image of said second real object.

* * * * *